RECORDING SYSTEMS

Filed March 3, 1954 3 Sheets-Sheet 1

INVENTORS D. MITCHELL
E. VROOM
BY William F. Simpson
ATTORNEY

INVENTORS D. MITCHELL
E. VROOM
BY William F. Simpson
ATTORNEY

INVENTORS D. MITCHELL
E. VROOM
BY William F. Simpson
ATTORNEY

United States Patent Office 2,784,049

Patented Mar. 5, 1957

2,784,049

RECORDING SYSTEMS

Doren Mitchell, Martinsville, N. J., and Edward Vroom, Brooklyn, Conn., assignors to Bell Telephone Laboratories, Incorporated, New York, N. Y., a corporation of New York Application March 3, 1954, Serial No. 413,785

13 Claims. (Cl. 346—44)

Figures 1, 4:
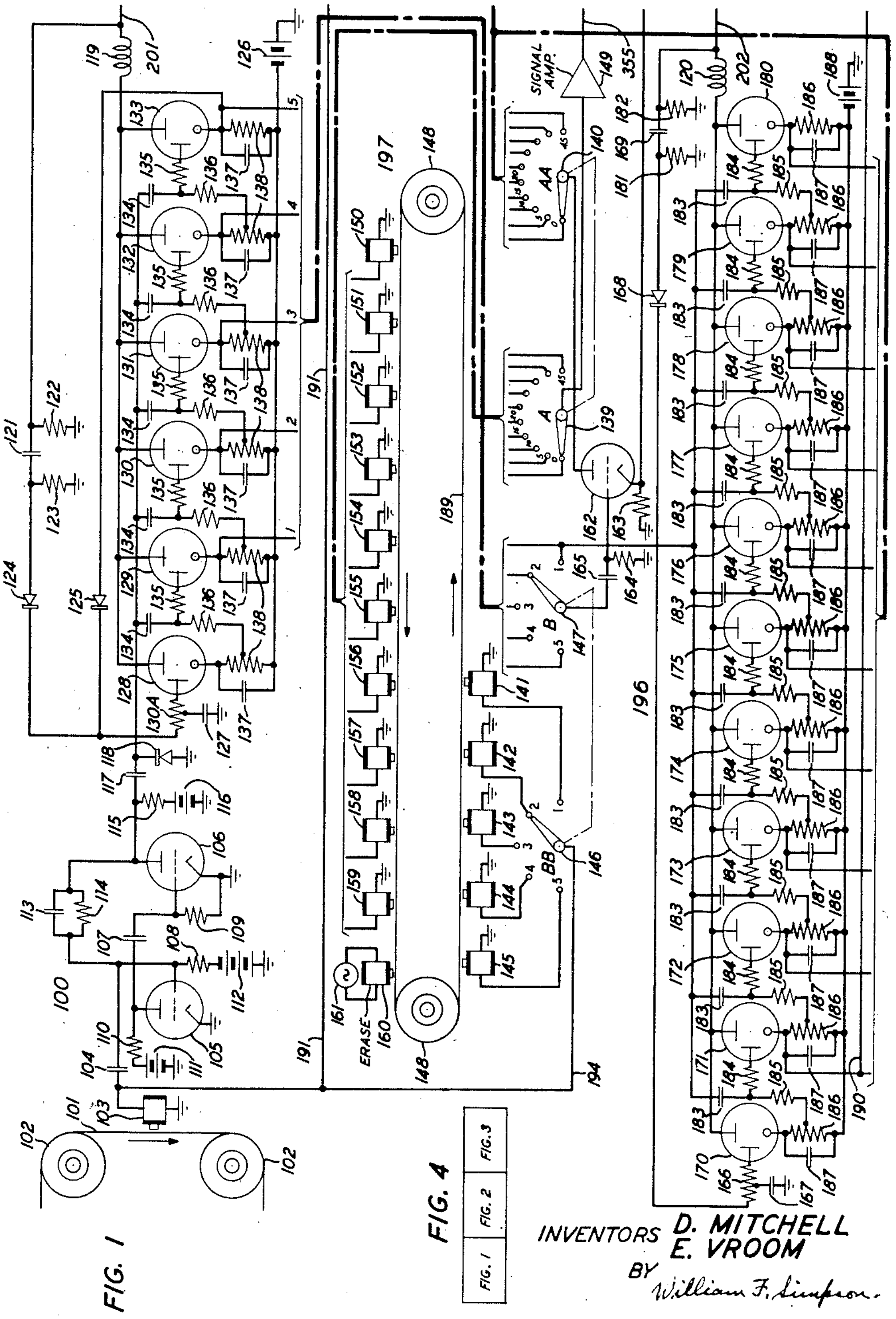

This invention relates to magnetic recording systems and more particularly to systems for sorting and assembling magnetically recorded information.

Magnetic recorders are a convenient means of recording information since a large amount of information may be recorded on a small amount of magnetic medium. Characters such as letters or numbers may be recorded as magnetized spots wherein the position, or magnetic characteristic of each spot, indicates the particular character represented by it.

Magnetic recorders are utilized in automatic telephone systems for storing call or message information. By transforming the message information into electrical pulses and applying these pulses to a high speed magnetic medium, the information is made accessible for reading or reproduction, as, for example, in automatic message accounting systems of the type disclosed in Patent 2,594,495 granted April 29, 1952 to J. B. Retallack. The present invention pertains to a magnetic system for automatically assembling related items of information recorded in random sequence on a magnetic medium. For example, the information recorded on the magnetic medium could be provided at a telephone central office in the form of a plurality of entries for each call which are separated by many other entries for other calls. It is necessary to sort out the initial, the answer and the disconnect entries for a particular call in order to properly bill the subscriber for the call. The magnetic reading and sorting system for the central office magnetic medium must be able to recognize, translate and direct the recorded entry signals to proper sorting units.

In one specific embodiment of the present invention, the information to be sorted is in the form of sets of digits on a primary magnetic tape. The digits are coded on a two-out-of-five pulse-time modulation basis on the primary tape. A magnetic reading head provides an electrical indication of the recording to an electronic counting circuit and to a magnetic delay device. The counting circuit and delay device are preset by switches to function, or sort, in accordance with any digit of the entry on the primary tape, to operate one of ten recording tapes. The sorting digit determines which one of the ten recording tapes is to be utilized in recording the information stored in the delay device. Each of the ten recording tapes can be sorted, in a similar manner, with respect to a different digit of the entry to provide for a total of one hundred sorted recording tapes from the original primary tape. The primary tape, therefore, can be sorted with respect to any number of digits to provide for any factor of ten sorted outputs.

It is an object of the present invention to provide for a magnetic sorting system presenting information on a plurality of magnetic output tapes in accordance with any recorded digit of a plurality of information entries upon a magnetic input tape.

Another object of the invention is the provision, of a sorting system, having a plurality of output tapes and a magnetic delay circuit which allows for the selection of one of the tapes and which allows also for start-stop operation of the selected tape.

Still another object of the invention is the provision of a magnetic sorting system wherein a plurality of entries on a magnetic medium are sorted in accordance with predetermined elements of each entry.

A further object of the invention is to provide delay means in a sorting system which stores the information to be sorted until after the selection and acceleration to recording speed of a magnetic output tape.

Still another object of the invention is the provision in a recording system of a magnetic digit analyzer for determining the number of digits in each entry to be sorted and for stopping the operation of a selected recording device after the recording of the last digit of said entry.

Still another object of the invention is to provide a sorting system having a digit analyzer for determining the character of the sorting digit, which may be any digit of a multidigital entry, and for selecting one of a plurality of recording devices in accordance therewith.

Figure 2:
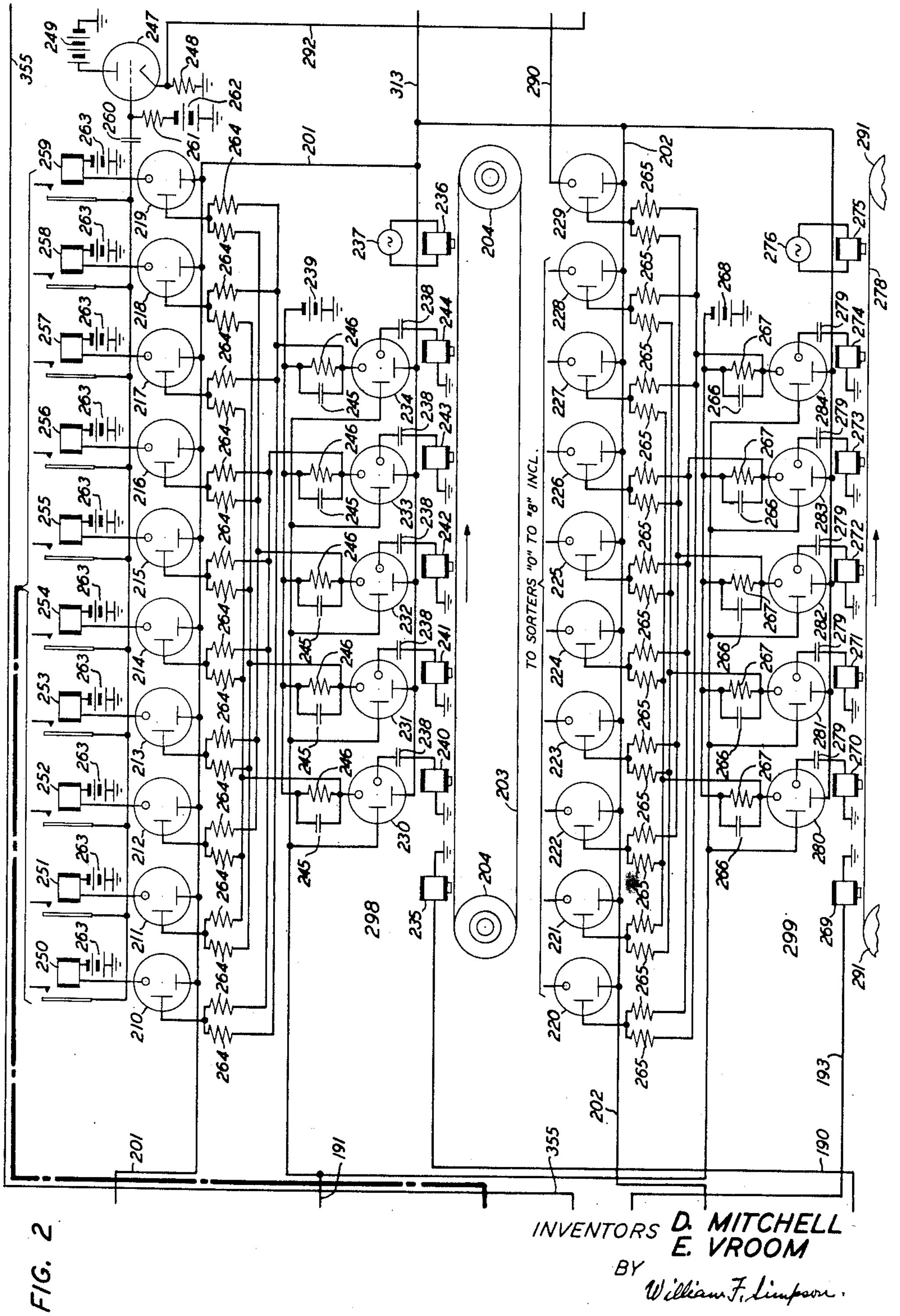
Figure 3:
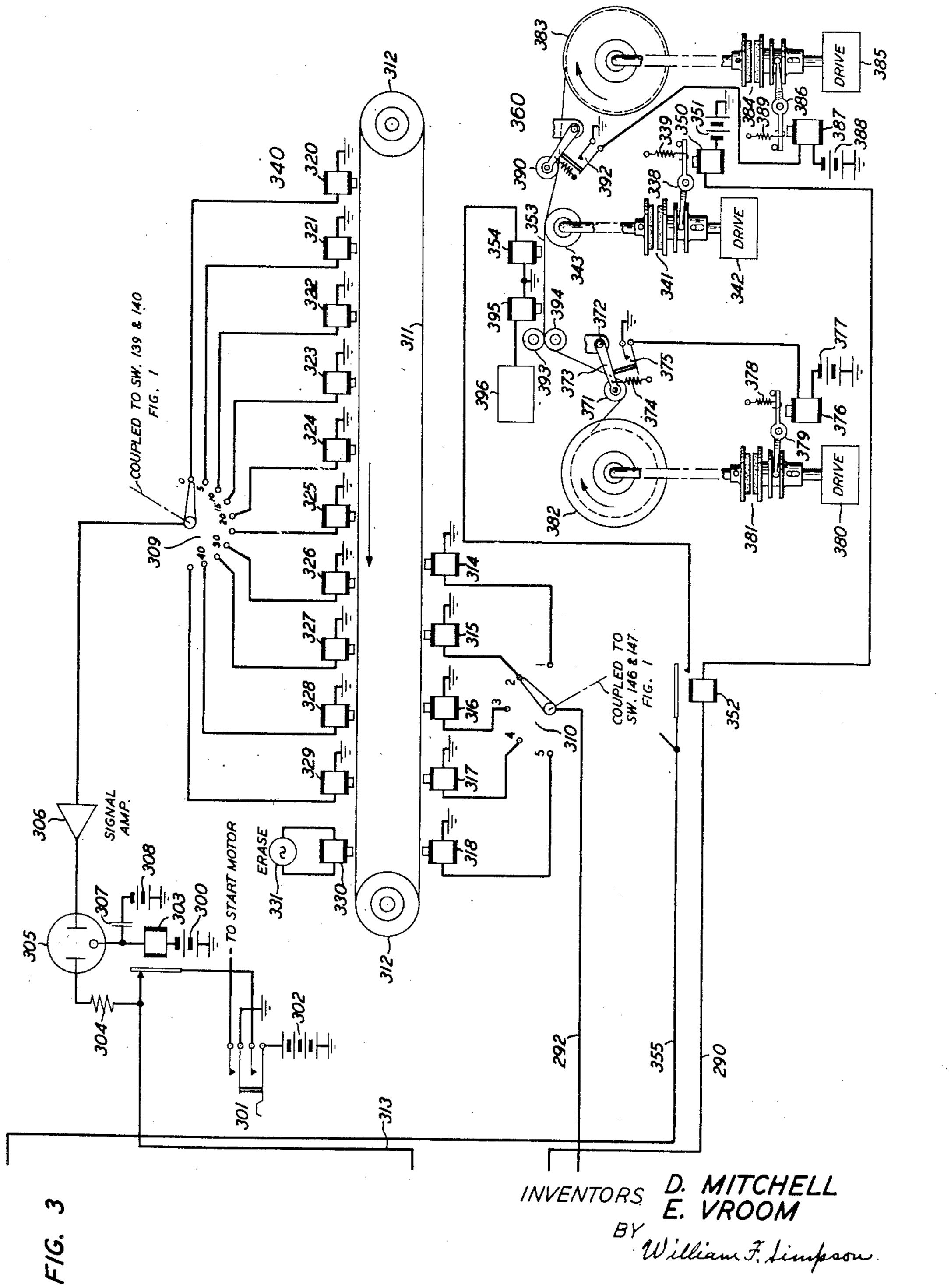

Further objects and advantages will become apparent to those skilled in the art upon consideration of the following description taken in conjunction with the drawings wherein:

Figs. 1, 2 and 3 when arranged in accordance with Fig. 4 illustrate the magnetic sorting system of the present invention; and Fig. 4 illustrates the arrangement of Figs. 1, 2 and 3.

The first digit of the reference numbers of the various components shown in Figs. 1 through 3 indicates the figure in which the component appears. For example, component 102 is shown in Fig. 1.

The input information to be sorted is provided on a primary magnetic tape 101 which passes over the guide wheels 102. In the specific embodiment of the present invention illustrated, the information on primary tape 101 is digital information coded on a pulse-time modulation basis. The principles of the present invention are not necessarily restricted to the processing of digital information but any information coded on a pulse-time modulation basis may be processed. The pulse-time modulation utilized herein is on a two-out-of-five basis for each digit. In other words, two pulses variably spaced in time are utilized to indicate the digit. The digits are grouped in entries, each of which may include up to fifty digits in five digit increments. The first digit of each entry indicates the number of digits in the entry with a 0 indicating five digits, a 1 indicating ten digits, a 2 indicating fifteen digits, etc. The sorting of the entries as is hereinafter described is accomplished in accordance with any digit of the entry. If, for example, the sorting is to be in accordance with the number of digits in an entry, the sorting digit would be the first digit of each entry.

To determine the sorting digit, the switches 146, 147 and 310, which are coupled together, and the switches 139, 140 and 309, which also are coupled together, are utilized. The arithmetic sum of the switch settings of the two sets of switches determines the sorting digit. The switch settings of switches 139, 140 and 310 are in increments of five and the settings of switches 146, 147 and 309 are in unit increments. As shown in Figs. 1 and 3 the switches 146, 147 and 310 are set at terminal 2 and the switches 139, 140 and 309 are set at terminal 0 indicating the sorting digit to be 2. The entries on tape 101 are accordingly to be sorted in accordance with the second digit of each entry.

After the switches 146, 147, 310, 139, 140 and 309 are set to determine the sorting digit a starting switch 301 is operated to initiate the sequence of automatic operations of sorting the entries on tape 101. The operation of switch 301 provides ground through its upper contact to the driving motors, not shown, for tape 101 and for the hereinafter described continuous tapes 189, 203, 278 and 311. The operation of switch 301 also connects the plus 130-volt potential source 302 through its lower contact and the normal contact of relay 303 to the gas tubes 305, 210 through 234, 280 through 284, 128 through 133 and 170 through 180. The source 302 is connected through resistor 304 to the anode of tube 305 and through the leads 313, 201 and 202 to the anodes of the tubes 210 through 234, 128 through 133, 280 through 284 and 170 through 180. The tubes 128 through 133 form a digit counter 195 for counting the digits in the groups of digits of an entry. The digit counter 195 is connected to the tubes 170 through 180 which form a group counter 196 as is hereinafter described. The digit counter 195 can count to five and the group counter 196 can count to ten, in increments of five so that the combination of counters 195 and 196 can count to fifty.

In addition to supplying anode potential, switch 301 also connects positive potential to the starting anodes of start tubes 128 and 170 in the counters 195 and 196, respectively. The source 302 is connected through the operated lower contact of switch 301, the normal contact of relay 303, lead 313, lead 201, through the inductor 119 to the anodes of tubes 128 through 133 and through the filter network comprising the resistors 122 and 123 and the capacitor 121, the positively poled varistor 124 and the resistor 130A, which is center tapped to ground through the capacitor 127, to the starting anode of tube 128. The cathode of the starting tube 128 and the cathodes of tubes 129 through 133, as well, are connected to the negative battery 126 through the parallel circuits comprising the capacitors 137 and the resistors 138. The application of a positive pulse through the capacitor 121, upon the operation of the starting switch 301, causes tube 128 to ionize. The positive potential provided through the inductor 119 is insufficient to cause the ionization of any of the tubes 129 through 133. When tube 128 ionizes however between the starting anode and the cathode, the potential provided through inductor 119 is sufficient to sustain the ionization which transfers to the main anode. When tube 128 ionizes the potential upon the starting anode of tube 129 increases due to its connection through resistors 135 and 136 to the contact of resistor 138. The increase in potential at the starting anode of tube 129 is insufficient to initiate ionization in tube 129 but functions to prime or ready the tube 129 for ionization as is hereinafter described.

In a similar manner the potential applied from source 302 through lead 202 causes the ionization of the starting tube 170 in counter 196 which is connected to lead 202 through the resistor 166, which is center tapped to ground through capacitor 167, the varistor 168 and the filter comprising the resistors 181 and 182 and the capacitor 169. The lead 202 is also connected through the inductor 120 to the main anodes of tubes 170 through 180 so that the ionization initiated in tube 170 transfers to its main anode. The cathodes of tubes 170 through 180 are connected to the negative potential source 188 through the parallel circuits comprising the capacitors 187 and the resistors 186. Resistors 186 connected to the cathodes of tubes 170 through 179 are center tapped through resistors 185 and 184 to the next adjacent tubes 171 through 180, so that tube 171 is primed or readied in a similar manner as described above in reference to tube 129.

When the first pulse, due to the passage of the first magnetic spot of the first digit on tape 101, is induced in the pick-up head or device 103, it causes the operation of a multivibrator circuit 100 comprising the tubes 105 and 106. The pulse induced in the head 103, is coupled through the coupling capacitor 104 to the grid of the triode tube 105, and through the parallel circuit consisting of the resistor 114 and the capacitor 113, to the anode of the triode 106. The cathodes of tubes 105 and 106 are connected to ground, and the anodes are connected respectively through the resistors 110 and 115 to the positive potential sources 111 and 116. The anode of tube 105 is also coupled through the capacitor 107 and resistor 109 to the cathode of tube 106. The junction between capacitor 107 and resistor 109 is connected to the grid of tube 106. The multivibrator circuit 100 is biased by the negative potential source 112 which is connected to the grid of tube 105 through the resistor 108 so that tube 105 is normally non-conducting and tube 106 is normally conducting. The application of a positive pulse through capacitor 104, due to the passage of a magnetic spot on the tape 101 adjacent the head 103, triggers multivibrator 100 or reverses the conductive conditions of tubes 105 and 106. As the positive pulse is applied to the grid of tube 105, conduction therethrough commences and the potential at its anode decreases, providing a negative pulse through capacitor 107 to the grid of tube 106. As the conduction through tube 106 decreases the potential at its anode increases providing a positive pulse through capacitor 114 to the grid of tube 105 to further increase the conduction through tube 105.

A pulse is also provided from the anode of tube 106 through the coupling capacitor 117, which is connected to ground through the negatively poled varistor 118, and through the capacitors 134 and resistors 135 to the starting anodes of tubes 129 through 133 described above. The varistor 118 prevents the application of negative pulses to the starting anodes of tubes 129 through 133 when the tube 106 returns to its original conductive condition. The positive pulse provided through the capacitors 134 to the starting anodes of tubes 129 through 133, is, in itself, insufficient to initiate ionization therein. The starting anodes of the tubes 129 through 133, however, are connected respectively through the resistors 135 and resistors 136 to the mid-connection of the resistors 138 which are each in turn connected to the next adjacent or preceding cathode of tubes 128 through 132. Since as described above tube 129 is primed due to the ionization of tube 128 at this time, it ionizes upon the application of the pulse from multivibrator 100. For one of the tubes 129 through 133 to ionize therefor the preceding tube must be ionized and a pulse must be provided from multivibrator 100. The pulse from multivibrator 100 in addition to causing the ionization of the primed tube 129 extinguishes the ionized tube 128 by increasing its cathode potential. The pulse is coupled through capacitor 117, capacitor 134, resistor 136, and resistor 138 to the cathode of tube 128. In this manner a pulse from multivibrator 100 ionizes the primed tube in counter 195 and extinguishes the ionized tube.

The multivibrator circuit 100 restores to its normal condition in approximately 4 milliseconds after being triggered. The 4-millisecond interval is sufficient to bridge all the elements or pulses comprising a digit which is provided in 3.5 milliseconds. In other words, the multi-vibrator circuit 100 provides one pulse through the capacitor 117 into the counting circuit comprising tubes 128 through 133 for each digit.

The ionization across the starting gap of tube 129 transfers across the main gap due to the positive potential provided to the main anode through lead 201 and inductor 119, as described above. When tube 129 ionizes it primes tube 130 for ionization and causes the ionization of tube 171 in counter 196. The cathode of tube 129 is connected respectively to the starting anodes of the tubes 171 through 180 through the capacitors 183 and resistors 184. The increase of potential upon the cathode of tube 129 when it ionizes functions to ionize tube 171 in a similar manner as the pulse provided by the multivibrator circuit 100 to the starting anode of tube 129. The digit counter 195 is connected to the group counter 196 only by the connection described above from the cathode of tube 129. Whenever tube 129 ionizes a pulse is provided to the group counter 196 causing it to step. Since the digit counter 195 counts up to five, a pulse is provided to the group counter 196 on every fifth pulse so that each step therein is a five-digit or group step.

When tube 171 ionizes it provides a positive pulse from its cathode through lead 190 to the spot recording head 235 which is positioned adjacent the continuous magnetic tape 203, briefly mentioned above, of the digit analyzer 298. The digit analyzer 298 determines the number of groups of digits in the entry being sorted as indicated by the first digit. Only the cathode of tube 171, which ionizes upon the occurrence of the first digit, is connected to the digit analyzer 298. The rotation of tape 203 in digit analyzer 298, on the wheels 204 and 205, was initiated upon the operation of the switch 301 also as described above. The application of the positive potential to the head 235 induces a magnetic spot on the tape 203. The tape 203 rotates at a uniform rate in the direction indicated by the arrow so that the induced spot passes adjacent the reading heads 240 through 244 which are positioned adjacent the tape 203. As the magnetic spot passes adjacent each of the heads 240 through 244 it initiates a pulse therein which is coupled through a capacitor 238, respectively, to the starting cathode of one of the tubes 230 through 234. The magnetic spot is thereafter erased when it passes adjacent the erase head 236 which is energized by the alternating-current source 237. At the same time that the magnetic spot provided by the head 235 passes adjacent the heads 240 through 244, the succeeding pulses from the original record tape 101 are applied through lead 191 from the pick-up head 103 to the starting anode of tubes 230 through 234. When the pulses provided from the heads 240 through 244 are coincident with the pulses provided through lead 191, the tubes 230 through 234, to which these coincident pulses are applied ionize.

Four pulses are provided for each digit, a start pulse, two-out-of-five digit pulses and an end pulse. The speed of tape 101 is at approximately twenty inches per second to provide for two hundred digits per second or 5 milliseconds per digit. Each spot utilizes .5 millisecond, with the two-out-of-five digit spots utilizing 2.5 milliseconds and with the spacing between digits utilizing 1.5 milliseconds. The first pulse provided by the head 103 is induced by the start pulse of the first digit and provides as described above for the energization of the head 235. The next pulses provided by the head 103 are the induced digit pulses, which are the coincident pulses for tubes 230 through 234. The speed of tape 203 provides for a .5 millisecond interval before the induced magnetic spot reaches head 240 and for a .5 millisecond interval between each pair of heads 240 through 244. The two, time modulation, pulses, through lead 191, coincide with the passage of the magnetic spot on tape 203 adjacent two of the heads 240 through 244 to ionize two out of five of the tubes 230 through 234. The ionization in the two-out-of-five tubes 230 through 234 transfers across the main gap since the anodes are connected as described above to source 302 and the cathodes are connected respectively to the negative potential source 239 through the resistors 246 shunted respectively by capacitors 245.

The two of the tubes 230 through 234 which ionized translate into and ionize, as is hereinafter described, one of the ten translator tubes 210 through 219 to indicate the total number of digit groups in the entry. Each of the cathodes of tubes 230 through 234 is connected to four out of ten tubes 210 through 219 through resistors 264. Since there are five tubes 230 through 234 with four connections from the cathode of each tube 230 through 234 and ten of the tubes 210 through 219, each of the tubes 210 through 219 is connected to two of the cathodes of tubes 230 through 234. In order for one of the tubes 210 through 219 to ionize, it is necessary for both of the tubes 230 through 234 that are connected thereto to be ionized. The two resistors 264 which are connected to the starting anode of one of the tubes 210 through 219 form a voltage divider between two of the cathodes of tubes 230 through 234. If only one of these two tubes is ionized the increase of potential at the starting anode of the associated one of tubes 210 through 219 is insufficient to cause ionization. When, however, both of the tubes 230 through 234 are ionized the increase of potential at the center of the voltage divider formed by the two resistors 264 is sufficient to cause ionization. For example, when tubes 230 and 233 are ionized, the potential at the starting anode of tube 214 increases and tube 214 ionizes. The starting anode of tube 214 is the only starting anode of tubes 210 through 219 which is jointly connected to the cathodes of tubes 230 and 233. The cathodes of tubes 210 through 219 are connected respectively through the windings of relays 250 through 259 to the negative potential sources 263. The ionization of one of the tubes 210 through 219 causes the operation of the associated one of relays 250 through 259. For example, when the tube 214 ionizes it causes the operation of the relay 254 which is associated therewith.

The operation of one of the relays 250 through 259 provides an indication of the total number of digits in the entry since the digit being analyzed is the first digit as described above. The tape 203 and tubes 230 through 234 form in this manner the first digit analyzer 298 and the tubes 210 through 219 and relays 250 through 259 form a translator for the digit analyzer 298. The operation of one of the relays 250 through 259 indicates the number of groups of five digits in the entry so that as hereinafter described when the indicated group of five digits is read by the reading head 103, described above, a timing sequence of events is initiated to terminate the sequence of operations of the hereinafter described magnetic recording apparatus 360. As described above, only the first digit initiates a sequence of operations described above in the digit analyzer 298. It is only the cathode of tube 171, which is the 0 tube or the tube indicating the first group of five digits, that is connected to the recording head 235 of the digit analyzer 298. If, for example, the entry comprises five groups of five digits each, relay 254 would be operated; six groups, relay 255 would be operated, etc.

When the second digit pulses are induced in the pickup head 103 the operation of the multivibrator 100 causes the ionization of tube 130 and extinguishes tube 129, in a similar manner as described above in reference to the ionization of tube 129 and the extinguishment of tube 128. The cathode of tube 130 is connected through contact 2 of switch 147 and capacitor 165, shunted to ground by the grid-leak resistor 164, to the grid of the control tube 162. The setting of switches 147, 146, 139, 140, 309 and 310 as described above compensates for the position of the sorting digit which, in the illustrative example described herein, is the second digit. The anode of tube 162 is connected through the 0 contact of switch 140 to the cathode of tube 171 which is ionized at this time as described above. Due to the ionization of tube 171 a positive potential exists at the anode of tube 162 so that the application of a positive potential to the grid thereof causes conduction. In this manner when tubes 130 and 171 are ionized, a positive pulse is applied to the grid of tube 162. The determination of when a positive pulse is to be applied to the grid of tube 162 is provided by the switch 147. The setting of switch 140 determines during which group of five digits a positive potential will be provided to the anode of tube 162, and the setting of switch 147 determines which digit in a group of five digits will cause the application of a positive pulse to the grid of tube 162.

The cathode of tube 162 is connected to ground through the cathode resistor 163 and through lead 193 to the recording head 269 of the pulse timer circuit or digit analyzer 299 which includes the magnetic tape 278 briefly mentioned above. The tape 278 is supported on the wheels 291 and was rotated upon the operation of switch 301 as described above. The tape 278 rotates in a direction indicated by the arrow so that the magnetic spot applied thereto responsive to the conduction of tube 162, passes adjacent the five reading heads 270 through 274 which have associated therewith tubes 280 through 284, respectively. The magnetic spot provided by the head 269 is erased as it passes adjacent the erasing head 275 energized by the source 276. The reading heads 270 through 274 are connected respectively through the capacitors 279 to the starting cathodes of tubes 280 through 284. The starting anodes of tubes 280 through 284 are connected to lead 191 described above so that the digit pulses from the reading head 103 are applied thereto. The coincidence of the pulses through lead 191 and from the heads 274 causes two out of the five tubes 280 through 284 to ionize. The pulse timer circuit or digit analyzer 299 operates in a similar manner as the digit analyzer 298, described above. The main anodes of tubes 280 through 284 are connected to lead 202 as described above, and the cathodes are connected respectively through the parallel circuits comprising the capacitors 266 and resistors 267 to the negative potential source 268, and in combinations to the starting anodes of the translator tubes 220 through 229. The cathodes of tubes 280 through 284 are connected through the resistors 265 in a similar manner as described above in reference to the resistors 264 which connect the tubes 230 through 234 with the tubes 210 through 219.

Each of the cathodes of tubes 220 through 229 is connected to a final recording apparatus 360. Only the recording apparatus 360 connected to the cathode of tube 229 is shown, but a similar recording apparatus 360 is connected to each of the cathodes 220 through 228. If the sorting digit, which in the illustrative example described herein is the second digit, is a 9, tube 229 is ionized closing an operating path for relay 352 and the magnetic clutch magnet 350 which is connected to the negative potential source 351. The energization of magnet 350 causes the final recording tape 353 to come up to recording speed in approximately 15 milliseconds as is hereinafter described. When relay 350 is energized, it attracts the armature 338 which is resiliently supported by the spring 339. The rotation of armature 338 engages the clutch 341 so that the drive or motor unit 342 is coupled to the driving wheel 343 to start the movement of the recording tape 353. The tape 353 has one turn about the wheel 343 which moves it to the right. As the tape 353 is moved to the right by wheel 343, the idler 371 is rotated about the pivot 372 on the arm 373 against the tension of the spring 374. As the slack portion of tape 353 about idler 371 is pulled up, it passes between the guide rollers 393 and 394 adjacent an erase coil 395, record coil 354, an idler 390, to the take-up coil 383. Upon movement of idler 371, contact 375 is closed and ground is applied to relay 376 which is also connected to the battery 377. The energization of relay 376 causes the clockwise rotation of armature 379 against the spring 378 to engage the clutch 381. When clutch 381 is engaged, the drive mechanism 380 rotates a storage reel 382 in a clockwise manner. The take-up coil or reel 383 is rotated in a similar manner by the drive mechanism 385 through clutch 384 when the idler 390 is lowered or rotated in a counterclockwise manner. The idler 390 is lowered when slack of tape 353 is provided by the rotation of reel 343 as described above. As the idler 390 is lowered, contacts 392 close and provide a connection from ground through relay 387 to battery 388. The energization of relay 387 activates the armature 386 against the spring 389 to engage the clutch 384. The idler mechanisms comprising idlers 371 and 390 are light so that the amount of mass to be accelerated by the tape drive 342 is comparatively small. Either or both of the coils or reels 382 and 383 may have considerable inertia due to the tape 353 wound therein and clutches 381 and 384 may slip as tape 353 is accelerated. The idlers 371 and 390, however, are so positioned and the slack in tape 353 adequate so that the drive 342 need not rotate the reel 383. The delay of time required from closure of the operating path of the clutch magnet 350 to the movement of the tape 353 at recording speed is approximately 15 milliseconds. The tape 353 is cleaned or erased before the recording thereon by the erase magnet 395 which is connected to the erasing source 396.

The operation of relay 352 described above upon the selection of a recording apparatus 360 connects the recording head 354 through lead 355 to the signal amplifier 149. The signal or pulse amplifier 149 amplifies signals provided thereto through the 0 terminal of switch 139 from magnetic delay apparatus 197. The connection to amplifier 149 is from the 0 pick-up head 150 which is associated with the magnetic tape 189 briefly mentioned above. The delay apparatus 197 has ten pick-up heads 150 through 159 positioned adjacent the magnetic tape 189 which is supported on the wheels 148. There are also five recording heads 141 through 145 and an erasing head 160 positioned adjacent the tape 189. The tape 189 provides for a delay as is hereinafter described for the signals from tape 101 for an interval of time equivalent to the time for bringing up the speed, the tape 353 described above, plus the amount of time corresponding from the start of the entry to the occurrence of the sorting digit. The pulses induced in the recording head 103 are connected through lead 194 and terminal 2 of switch 146 to the recording head 142. The tape 189 is rotated in a direction indicated by the arrows so that the setting of switch 146 determines which one of the five recording heads 141 through 145 and correspondingly the length of time to be selected or utilized between the recording of the pulses of tape 189 and the reading thereof by one of the reading heads 150 through 159. The setting of switch 139 determines which one of the ten reading heads 151 through 159 will function to provide the re-recorded pulses from tape 189 to the signal amplifier 149 and thence to one of the ten final recording heads 354. The setting of the two switches 139 and 146 therefore determines the delay interval. The recording heads 141 through 145 are spaced to provide a 5-millisecond difference in delay between two adjacent heads with the head 141 providing for the minimum delay. The heads 150 through 159 are spaced to provide 25-millisecond delay intervals. The spacings shown on the drawings are only approximate and are not to be taken as indicating the actual times involved. The delayed information from the tape 189 is transmitted through lead 355 to whichever of the final tapes 353 is connected thereto by the operated one of the ten relays 352.

The recording sequence for an entry proceeds in this manner with the pulses supplied by the reading head 103 being delayed by the delay apparatus 197 until the particular one of tubes 170 through 180, which is connected to the contact of the operated one of relays 250 through 259, is ionized. For example, if relay 254 was operated upon the selection thereof by the digit analyzer 298, the ionization of tube 176 provides a positive pulse from its cathode through the operated contact of relay 254 and capacitor 260 to the control grid of triode 247. The tube 247 is normally biased to cut-off by the connection of its grid through resistor 261 to the negative potential source 262. The anode of tube 247 is connected to the positive potential source 249 and the cathode thereof is connected to ground through the cathode resistor 248 and through lead 292 and terminal 2 of switch 310 to the recording head 315 of the delay apparatus 340. Tube 247 in this manner repeats the pulse applied thereto to energize one of five recording heads 314 through 318 as selected by the switch 310. In the illustrative example described herein the switch 310 is set at its terminal 2 so that the recording head 315 is energized. The delay apparatus 340 is similar to the delay apparatus 197 described above. The recording heads 314 through 318 are positioned adjacent the cut-off delay tape 311 which is supported on the wheels 312. Also positioned adjacent the tape 311 are the ten pick-up heads 320 through 329 and the erasing head 330 which is energized by the source 331. The pick-up heads 320 through 329 are connected respectively to the ten terminals of switch 309. In this manner the setting of switches 309 and 310 determines the delay interval between the recording of a magnetic spot on tape 311 and the reading thereof by one of the reading heads 320 through 329. The delay interval is the same as provided by tape 189 since the switches 310 and 146 are set at the same terminal and the switches 309 and 139 are set at the same terminal.

As the magnetic spot on tape 311 passes adjacent the selected one of heads 320 through 329, which in the illustrative example is head 320, a pulse is provided through the signal amplifier 306 to the starting anode of the stop tube 305. The main anode of tube 305 as described above is connected through the resistor 304, the normal contact of relay 303, the lower operated contact of switch 301 to the positive potential source 302. The cathode of tube 305 is connected through the winding of relay 303 to the negative potential source 309 and through the capacitor 307 to the negative potential source 308. The application of a positive pulse to the starting anode of tube 305 causes the ionization thereof and the operation of relay 303. The operation of relay 303 opens the path from the positive potential source 302 to lead 313 to remove anode potential from tubes 128 through 133, 170 through 180, 210 through 234, and 280 through 284. The release of relay 303 is delayed by the effect of the capacitor 307 which is shunted thereacross. The removal of the positive potential from lead 313 restores all the tubes to normal and causes the release of relay 352 and the magnetic clutch magnet 350 of the operated one of the final recorders 360. The release of the clutch magnet 350 allows the clutch 341 to disengage. When the clutch 341 is disengaged, the continued operation of drive 385 through the engaged clutch 384 raises the idler 390. The raising of idler 390 opens contact 392 which opens the energizing path for the clutch magnet 387. The deenergization of magnet 387 disengages the clutch 384. In a similar manner the continued rotation of wheel 382 by drive 380 allows the idler 371 to lower and open the contacts 375, the opening of contacts 375 opens the operating path of magnet 376 to release the clutch 381. The tape 315 in this manner slows down and stops upon the deenergization of the magnet 350. The tape 350 reaches a standstill in approximately 15 milliseconds.

When the original record tape 101 has been run through, ten new tapes 353 are provided, sorted in accordance with the second digit of each entry. The ten tapes 353 may be rewound so that they may be sorted for another digit, for example, the third digit of each entry. The process of sorting for this additional digit is the same as described above except that switches 139, 140, 309, 146, 147 and 310 would be reset to indicate the new sorting digit.

In the sorting system described above, the sorting digit may be any digit in a series of fifty digits but such a system is not necessarily restricted to the specific embodiment described herein. The sorting system, for example, may be used in conjunction with one hundred digit entries and each group of digits may include eight or ten digits instead of five. The sorting system of the present invention can be readily utilized to sort simultaneously in accordance with a plurality of sorting digits. The digit analyzer 299 would function for each sorting digit, and would select one of many recorders 360 upon the occurrence of the last sorting digit. Moreover the input may be provided directly as time-modulated pulses instead of from a tape. For example, the magnetic recording system described in our copending application Serial No. 413,784 filed on even date herewith could provide the output pulses directly to leads 191 and 194 of the present invention and avoid the intermediate operations of recording on, and reading from a tape such as 101 in the present invention.

It is therefore to be understood that the above-described arrangements are merely illustrative of the application of the principles of this invention. Numerous other arrangements may be devised by those skilled in the art without departing from the spirit and scope of the invention.

What is claimed is:

1. A system for sorting a plurality of multidigital entries comprising selector means; a magnetic medium having recorded thereon groups of signals representing said plurality of multidigital entries; reading means for converting said groups of signals to time-modulated electrical pulses; a digit counting circuit controlled by said reading means; a magnetic delay circuit connected to said reading means and controlled by said selector means; a plurality of magnetic recording means selectively connectable to said delay circuit; and a digit analyzer controlled by said selector means and said counting circuit for connecting one of said plurality of magnetic recording means to said magnetic delay circuit.

2. A system for sorting a plurality of multidigital entries in accordance with claim 1 wherein said digit analyzer comprises a continuous magnetic medium, a recording device positioned adjacent said magnetic medium and controlled by said selector means and said counting circuit, a plurality of reading devices positioned adjacent said recording medium, and a coincident circuit controlled by said reading devices and said reading means for selectively connecting said magnetic recording means to said delay device.

3. A system for sorting a plurality of multidigital entries in accordance with claim 1 comprising in addition a second digit analyzer controlled by said counting circuit upon the occurrence of a predetermined digit which indicates the number of digits in the entry; a second magnetic delay device controlled by said second digit analyzer; and terminating means controlled by said second delay device for normalizing said system.

4. A recording system comprising input means for supplying entries having groups of coded signals on a time-modulated basis; a digit selector for selecting predetermined ones of said groups of coded signals; a digit analyzer controlled by said digit selector for decoding said predetermined ones of said groups of coded signals in each entry; a plurality of recording devices; means controlled by said digit analyzer in accordance with said predetermined groups for selectively operating said recording devices; and delay means connecting said recording devices with said input means and controlled by said digit selector for delaying said coded signals for an interval greater than the time for supplying said groups preceding said predetermined groups plus the time for readying said selected recording device.

5. A recording system in accordance with claim 4 wherein said delay means comprises a continuous magnetic medium; a plurality of recording devices positioned adjacent said recording medium and selectively connected by said selecting means to said input means; and a plurality of reading devices positioned adjacent said magnetic medium selectively connected by said selecting means to said selectively operated recording devices.

6. A recording system in accordance with claim 5 comprising in addition a digit analyzer for determining the number of said groups in each entry; and means controlled by said group determining digit analyzer for stopping the operation of said selected recording devices and for normalizing said first and said second-mentioned digit analyzers.

7. A system for sorting a plurality of multidigital entries comprising selector means for predetermining the sorting digit; a magnetic medium having recorded thereon groups of signals representing said plurality of multidigital entries; a reading device for converting said groups of signals to time-modulated electrical pulses; a digit counting circuit controlled by said reading device; a first magnetic delay circuit connected to said reading device and controlled by said selector means; ten magnetic recording means selectively connectable to said first delay circuit; a first digit analyzer controlled by said selector means and said counting circuit for connecting in accordance with said sorting digit one of said ten magnetic recording means to said first magnetic delay circuit; a second digit analyzer controlled by said counting circuit upon the occurrence of a predetermined digit which indicates the number of digits in the entry; a second magnetic delay device controlled by said second digit analyzer; and terminating means controlled by said second magnetic delay device for disconnecting the connected one of said ten magnetic recording means and for normalizing said first and said second digit analyzers; said first and said second digit analyzers each comprising a continuous magnetic medium, a recording device positioned adjacent said magnetic medium and controlled by said counting circuit, a plurality of reading devices positioned adjacent said recording medium and a coincident circuit controlled by said reading devices positioned adjacent said recording medium and by said reading devices for converting said groups of signals for selectively connecting said magnetic recording means to said first and said second delay devices.

8. A system for sorting a plurality of multidigital entries in accordance with claim 7 wherein said first and said second delay devices each comprises a continuous magnetic medium; a plurality of recording devices positioned adjacent said medium and selectively connectable by said selector means to said reading device; a plurality of reading devices positioned adjacent said magnetic medium selectively connectable by said selector means to the connected one of said ten magnetic recording means, and an erasing device positioned adjacent said magnetic medium, the interval accorded between the energization of the connected one of said recording devices and the connected one of said reading devices being greater than the time necessary for said groups of signals preceding the group corresponding to said sorting digit plus the time for readying said connected recording means.

9. In a sorting system, a magnetic input medium having a plurality of groups of signals recorded thereon with each of said groups having a plurality of subgroups; signal responsive means for converting said subgroups of signals to subgroups of pulse time coded electrical signals including means for continuously moving said medium; a digit analyzer responsive to a predetermined one of said subgroups of electrical signals; a plurality of magnetic recorders selectively controlled by said digit analyzer in accordance with said predetermined subgroups of electrical signals; and magnetic delay means for storing said subgroups of electrical signals until the completion of the operation of said digit analyzer.

10. In a sorting system in accordance with claim 9 wherein said delay means comprises a continuous magnetic medium; a plurality of recording devices positioned adjacent said magnetic medium and selectively connectable in accordance with said predetermined subgroups to said responsive means; a plurality of reading devices positioned adjacent said magnetic medium and selectively connectable in accordance with said predetermined subgroup to the subgroup of the selected one of said recorders and an erasing device positioned adjacent said magnetic medium, the interval accorded between the energization of the connected one of said recording devices and the connected one of said reading devices being greater than the time necessary for said groups of signals preceding said predetermined subgroup plus the time for readying said selected recorder.

11. A system for classifying recorded groups of items of intelligence in accordance with the character of a predetermined one of said items in each group comprising selector means for adjusting the system in accordance with the position of said predetermined item; counting means for determining the position of each of said items; an item analyzer controlled by said counting means and by said selector means for determining the character of said predetermined item; a plurality of character output devices selectively operated under control of said analyzer for recording said groups; and delay means for storing said items until the operation of said selected output devices.

12. A system in accordance with claim 11 comprising in addition analyzing means for determining the number of said items in each of said groups; and terminating means controlled by said analyzing means for stopping the operation of said selected output devices after the recording of the last of said items of each of said groups by said selected output devices.

13. A system in accordance with claim 12 wherein said item analyzer comprises a continuous magnetic medium, a recording device positioned adjacent said magnetic medium and controlled by said selector means and said counting means, a plurality of reading devices positioned adjacent said recording medium, and a coincident circuit controlled by said reading devices for selectively connecting said output devices to said delay means.

References Cited in the file of this patent

UNITED STATES PATENTS

| | | |
|---|---|---|
| 2,668,875 | Shepherd | Feb. 9, 1954 |
| 2,675,427 | Newby | Apr. 13, 1954 |